United States Patent Office.

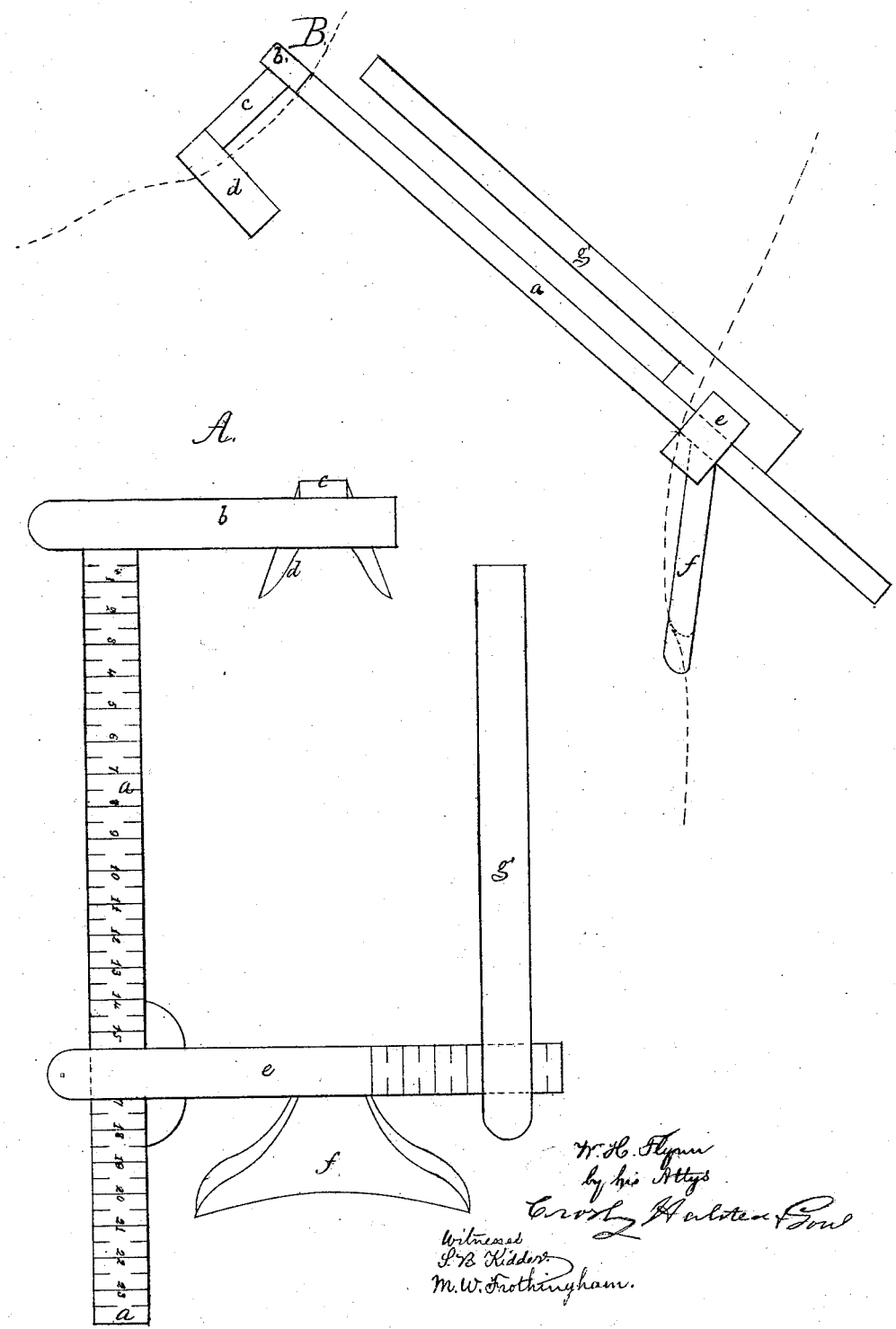

WILLIAM H. FLYNN, OF SOMERVILLE, MASSACHUSETTS, ASSIGNOR TO HIMSELF, THOMAS J. McCORMICK, AND E. P. EDSTROM, JR.

Letters Patent No. 99,660, dated February 8, 1870.

IMPROVED MACHINE FOR MEASURING HORSES FOR COLLARS.

The Schedule referred to in these Letters Patent and making part of the same.

*To all whom it may concern:*

Be it known that I, WILLIAM H. FLYNN, of Somerville, in the county of Middlesex, and State of Massachusetts, have invented an Improved Device for Measuring Horses for Horse-Collars; and I do hereby declare that the following, taken in connection with the drawings which accompany and form part of this specification, is a description of my invention sufficient to enable those skilled in the art to practise it.

The invention relates to the construction of a scale for measuring necks of horses, with reference to making well-fitting horse-collars.

The usual custom among horse-collar makers in obtaining the measurement for the length of the collar, is to lay a rule vertically against the side of the horse's neck, squinting across from the upper and under surface of the neck to ascertain the distance from the centre of the breast to the top of the neck, it being more a matter of guessing than of actual measurement. It will be obvious that this process is very inaccurate.

A similar method is pursued in measuring for the width of the collar, with correspondingly unreliable results.

In my method, I employ a quadrangular frame, having guiding-devices, which bring the figured parts of a scale, or members of the frame, into position for denoting the proper measurements; and My invention consists, primarily, in a frame or scale, having fixed upon one end an arm, which carries a forked or bifurcated piece, to rest upon the top of the neck of the horse, and also having a sliding arm, which carries a device properly formed for resting against the breast of the horse.

The drawings represent a scale or measuring-apparatus embodying the invention.

A shows a front view of the apparatus.

B, a side view of the same, illustrating its application around the neck of a horse.

*a* denotes a straight strip or rule, the front surface of which is provided with suitable divisions and figures, as seen at A.

At the top of this strip is fixed one end of an arm, *b*, whose other end, extending inwardly from the strip, has a short projection, *c*, from which depends a crotch or fork, *d*, so formed that it will straddle the neck of a horse down against or just above the withers, its position relatively to the arm *b*, or the length of the piece *c*, being such that the arm will rest upon the neck where the roll of the collar is to come.

*e* denotes a sliding or movable arm, suitably formed at one end for sliding easily upon the strip *a*, and keeping its right angular position to such strip, the upper edge of the slide being straight, and being the edge by the position of which, relatively to the divisions and figures on the strip *a*, the measurement is determined.

At a distance along the slide from the strip *a*, equal to the distance from the top of the strip *a* of the piece *c*, a breast-piece, *f*, projects from the rear side of the slide, the inner end of the breast-piece being widened and formed hollowing, as seen at A, this piece, when the measurement is being made, being pressed up to the breast, and extending partially around the same.

In using the apparatus, the arm *e* is slid down, and the frame is carried over the head of the horse, and the piece *c* is laid upon the horse's neck, with the fork *d* straddling the neck above the withers. The main strip *a* is then laid against the shoulder, and the arm *e* is slid up to the breast, the piece *f* following down and embracing the breast, all as seen at B, where the dotted line denotes the neck and breast of the horse. The top of the slide, or its union with the scale on the strip *a*, will now indicate on the scale the depth of the neck for the inner length of the collar at the roll.

To obtain the width, the lower arm or slide *e* is provided with a vertical slide, *g*, and when the measuring-frame is in position, as above described, this slide *g* is pushed in against the breast, in front of the shoulder, when the width from the centre of the breast-piece to the inner side of the slide *g* may be read upon a scale on the front of the arm *e*, as seen at A, this measurement, of course, denoting just half the inner width of the collar at the widest part thereof.

By these means, the neck of any horse can be readily measured with accuracy, and without the skill required to make such measurements in the ordinary manner.

I claim—

In combination with the main strip or scale-piece *a*, the fixed arm *b*, having the neck-piece *d*, and the movable arm *e*, having the breast-piece *f*, substantially as described.

Also, in combination with the main strip *a* and arms *b* and *e*, the slide *g*, substantially as described.

W. H. FLYNN.

Witnesses:
FRANCIS GOULD,
S. B. KIDDER.